(12) United States Patent
Krummell, Jr. et al.

(10) Patent No.: US 7,140,503 B2
(45) Date of Patent: Nov. 28, 2006

(54) PUSHBACK CART STORAGE SYSTEM

(75) Inventors: John V. R. Krummell, Jr., 5702 Bolsa Ave. Suite 150, Huntington Beach, CA (US) 92649; Ken Davison, Huntington Beach, CA (US); Thomas John Imholte, Huntington Beach, CA (US)

(73) Assignee: John V. R. Krummell, Jr., Huntington Beach, CA (US)

( * ) Notice: Subject to any disclaimer, the term of this patent is extended or adjusted under 35 U.S.C. 154(b) by 161 days.

(21) Appl. No.: 10/690,863

(22) Filed: Oct. 21, 2003

(65) Prior Publication Data

US 2005/0082246 A1   Apr. 21, 2005

(51) Int. Cl.
*A47F 1/04* (2006.01)
*B65G 13/00* (2006.01)

(52) U.S. Cl. ............... 211/151; 211/126.15; 211/191; 193/35 R; 414/276; 414/286

(58) Field of Classification Search ........... 211/151, 211/162, 191, 126.15, 59.2; 414/276, 233, 414/235, 286; 193/35 TE; 312/281; 280/79.3
See application file for complete search history.

(56) References Cited

U.S. PATENT DOCUMENTS

| 4,773,546 | A | * | 9/1988 | Konstant ............... 211/151 |
| 5,415,300 | A | | 5/1995 | Krummell et al. |
| 5,598,934 | A | | 2/1997 | Krummell et al. |
| 6,129,223 | A | * | 10/2000 | Krummell, Jr. ......... 211/151 |
| 6,488,248 | B1 | * | 12/2002 | Watt et al. ............ 248/279.1 |
| 6,851,562 | B1 | * | 2/2005 | Gorniak et al. ........ 211/59.2 |

* cited by examiner

*Primary Examiner*—Richard E. Chilcot, Jr.
*Assistant Examiner*—Jared W. Newton
(74) *Attorney, Agent, or Firm*—Perkins Coie LLP

(57) ABSTRACT

A pushback cart storage system includes a cart having a first pair of wheels located at a front end of the cart, and a second pair of wheels located between a rear end of the cart and a midpoint of the cart. The wheels roll along rails on a storage rack or frame. The second pair of wheels is located closer to the midpoint than to the rear end of the cart, such that the rear end of the cart extends beyond the end of the rails when the second pair of wheels are rolled to the end of the rails. Accordingly, less steel, or other material, is required to construct the rails of the storage rack, which reduces the overall cost and weight of the system, while allowing the system to support the same number of pallets as a conventional system.

14 Claims, 7 Drawing Sheets

PUSHBACK CART STORAGE SYSTEM

BACKGROUND OF THE INVENTION

The field of the invention is pushback cart storage systems. Pushback cart storage systems are typically used in warehouses and other storage facilities to efficiently store loaded pallets. Pushback cart storage systems typically include rolling carts for supporting pallets. The carts include wheels that roll along rails on storage racks or frames, and/or along tracks in other carts. The rails are preferably slightly inclined so that gravity assists in moving the carts forward along the rails to the front of the rack. A storage rack may include several levels of inclined rails for storing several pallets vertically.

By providing one or more rolling carts on a set of rails, pallets may be loaded onto carts and pushed back along the rails toward the rear of the storage rack. In this manner, pallets may be stored one in front of the other on the storage rack, and several pallets may be loaded and unloaded from a single aisle. As a result, the number of aisles required for forklifts to maneuver throughout a warehouse is minimized, and the usable space between aisles is therefore increased. Accordingly, aisle space required for forklift access when using conventional storage rack systems may instead be used for additional pallet storage racks, thus providing more efficient use of space.

Various pushback cart storage systems have been successfully used in the past, as described, for example, in U.S. Pat. Nos. 6,129,223, 5,415,300, and 5,598,934, incorporated herein by reference. While these systems have been effective, there is a need for improved designs that reduce overall system cost and increase storage efficiency.

SUMMARY OF THE INVENTION

The invention is directed to a pushback cart storage system including a cart having a first pair of wheels located at a front end (i.e., the end closest to a loading aisle in a storage facility) of the cart, and a second pair of wheels located between a rear end of the cart and a midpoint of the cart. The cart wheels roll along support rails on a storage rack or frame. The second pair of wheels is preferably located closer to the midpoint of the cart than to the rear end of the cart, so that a substantial portion of the rear end of the cart extends beyond the end of the support rails when the wheels are rolled to the end of the support rails. Accordingly, less steel, or other material, is required to construct the rails of the storage rack, which significantly reduces the overall cost and weight of the system, while allowing the system to support the same number of pallets as a conventional system.

In one aspect, a second cart is included. The second cart includes a pair of side rails each having a pair of wheels that are rollable along the support rails. A track or wheel guide is formed in each of the side rails. The front wheels on the first cart roll along the wheel guides of the second cart, thus forming a "3-deep" storage system for storing three pallets. Additional carts may be added in a similar manner to form a 4, 5, or 6-deep storage system.

In another aspect, each of the rear wheels on the first cart is located at a position 80% to 90% of a distance measured from the rear end of the cart side rail to the midpoint of the cart side rail to which the second wheel is attached.

In another aspect, a pushback rack storage system includes a cart having a pair of spaced apart side rails adapted to support a pallet having a predetermined length. The rear ends of the cart side rails extend beyond the first ends of the rear rails by 35% to 45% of the predetermined pallet length when the second wheels are rolled up against the first ends of the support rails.

In another aspect, the side rails on the cart each have a length that is 55% to 60% of a length of the support rails.

In another aspect, the cart side rails extend 16 to 20 inches beyond the first ends of the support rails when the second wheels are rolled up against the first ends of the support rails.

In another aspect, the cart side rails extend beyond the end of the support rails by more than 35% of the total length of the cart side rails when the second wheels are rolled up against the end of the support rails.

Other features and advantages of the invention will appear hereinafter. The features of the invention described above can be used separately or together, or in various combinations of one or more of them. The invention resides as well in sub-combinations of the features described.

BRIEF DESCRIPTION OF THE DRAWINGS

In the drawings, wherein similar reference characters denote similar elements throughout the several views.

DETAILED DESCRIPTION OF THE DRAWINGS

Figure 1:
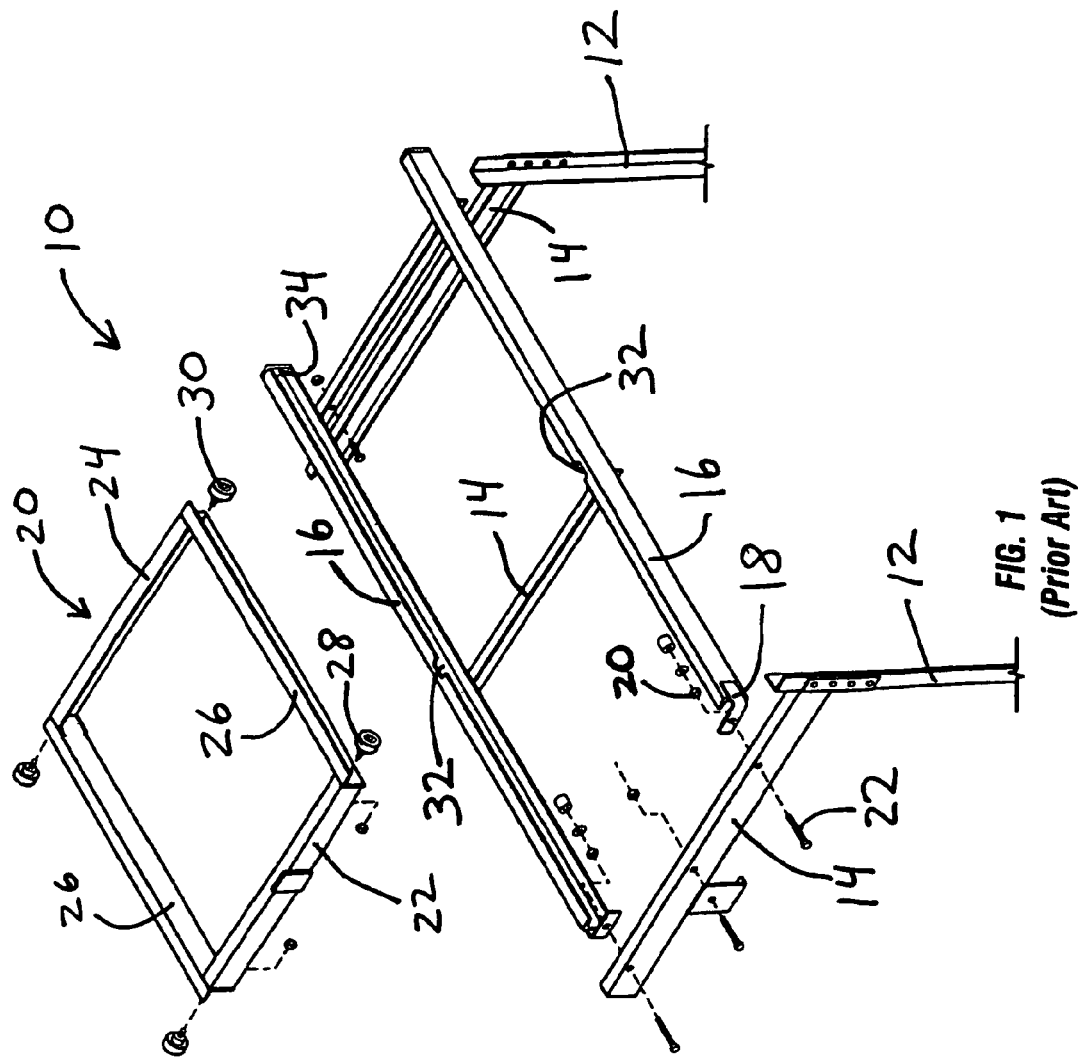
FIG. 1 is a partial perspective view of the components of a prior art pushback rack storage system.
Figure 2:
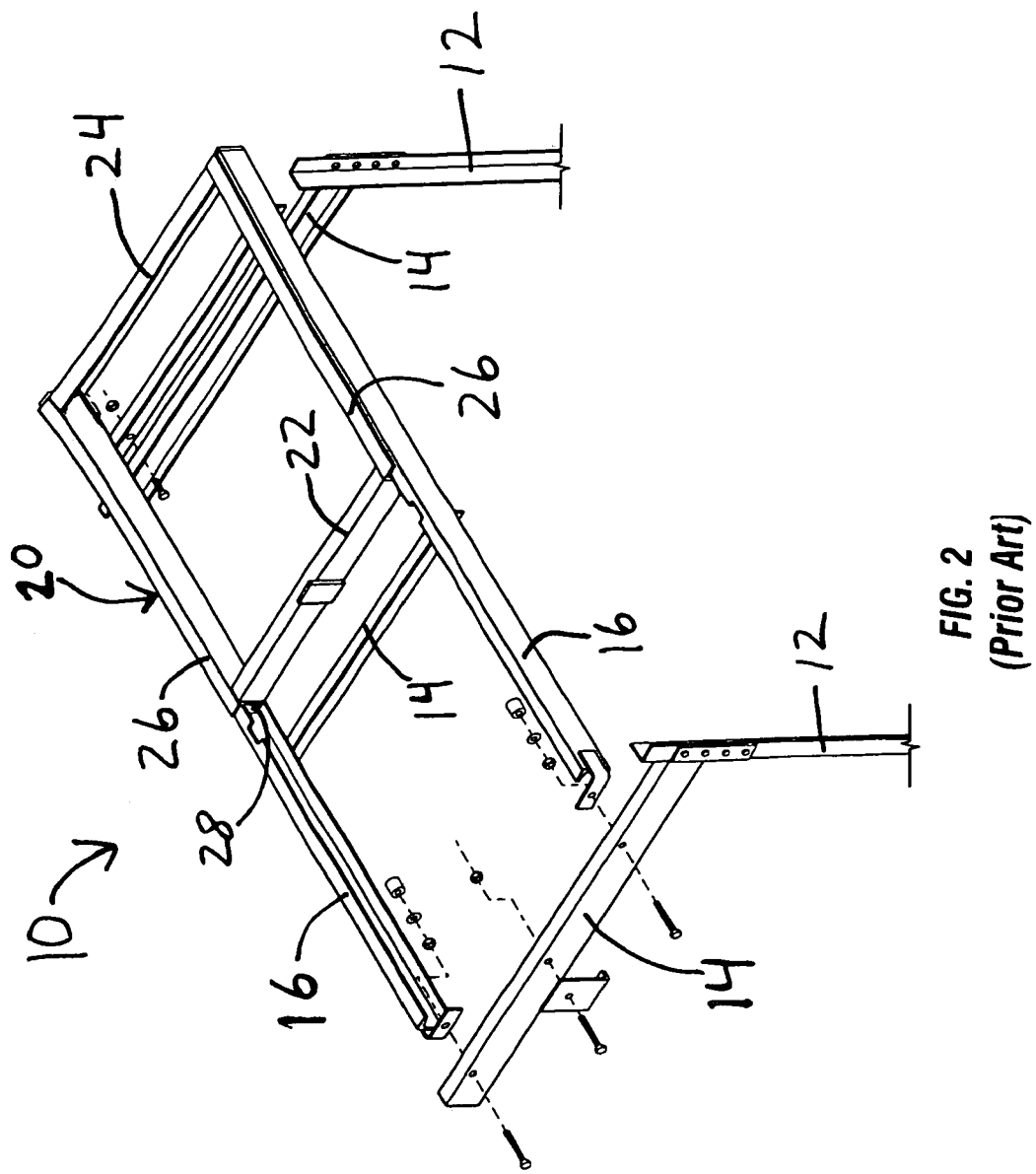
FIG. 2 is a partial perspective view of the prior art pushback rack storage system of FIG. 1 with the cart positioned at the rear end of the support rails.

Turning now in detail to the drawings, FIGS. 1 and 2 illustrate a prior art pushback cart storage system 10 including a support rack structure made up of vertical posts 12 and crossbars 14. The support rack structure includes pallet support rails 16 attached to the cross bars 14 via brackets 18, nuts 20, bolts 22, and/or any other suitable attachment means. The pallet support rails 16 may be of any design that provides a rolling track or wheel guide, e.g., I-beams, C-sections, etc., along which cart wheels may roll. The vertical posts 12 are preferably attached to the floor of a warehouse or other storage facility. Although only a single support rack is shown, in typical applications, several support racks are vertically stacked and/or horizontally attached to the vertical posts 12 to create a larger storage system.

In the embodiment illustrated in FIGS. 1 and 2, a single cart 20 is used in the storage system 10, thus forming a "2-deep" storage system or storage lane. Additional carts may be used as desired to increase the number of pallets or other items that may be stored in a single storage lane, as described in U.S. Pat. Nos. 5,415,300 and 6,129,223. In the 2-deep embodiment shown in FIGS. 1 and 2, a first pallet may be stored on the cart 20, and a second pallet may be stored on the support rails 16 in front of the cart 20, when the cart 20 is moved to a rear position, as described below. Accordingly, multiple pallets may be loaded into and but of a storage lane from a single aisle in a storage facility, thus minimizing the total aisle space required for forklift access in the storage facility.

The cart 20 preferably includes a substantially rectangular welded or bolted together frame, including a cart front rail 22 attached to a cart rear rail 24 by cart side rails 26. The cart side rails 26 are preferably sized to match the pallets to be stored. In typical applications, pallets have a length of approximately 44 to 48 inches, but any other size pallets and carts may be used. To minimize the amount of steel or other material required to construct the cart 20, a typical cart 20 has cart side rails 26 that are slightly shorter than the length of the pallet to be stored on the cart, allowing the pallet to extend slightly beyond the end of the cart 20. In general, the cart side rails have a length that is 90 to 100% of the length of the pallet, or 95% of the pallet length.

In a typical 2-deep storage system, approximately two times the length of each pallet to be stored is allocated in a storage facility to accommodate storage of two pallets in a single lane. For example, approximately 100 inches of storage facility depth are allocated for storing two 48 inch pallets in a single row. Of course, the cart side rails 26 and the pallet support rails 16 may be any other suitable length to accommodate other pallet sizes.

In the prior art storage system 10, front wheels 28 are rotatably attached to the front end of the cart side rails 26, and rear wheels 30 are rotatably attached to the rear end of the cart side rails 26. Each pallet support rail 16 on the storage rack structure preferably includes a slot or opening 32 through which the front and rear wheels 28, 30 may pass during installation to position the wheels 28, 30 in inner tracks or wheel guides formed in the pallet support rails 16. Alternatively, the front and rear wheels 28, 30 may be positioned to roll along outer tracks in the pallet support rails 16, as described in U.S. Pat. No. 6,129,223.

FIG. 2 illustrates the cart 20 positioned in the wheel guides of the pallet support rails 16 such that the front and rear wheels 28, 30 may roll along the support rails 16. The cart 20 is moveable along the pallet support rails 16 between the front and rear of the support rails 16. In use, the cart 20 is initially positioned at the front end of the pallet support rails 16. A first pallet is loaded onto the cart 20 with a forklift or other suitable loading means. As the forklift then moves a second pallet into the rack, the cart 20 and the first pallet on the cart are pushed to the rear end of the support rails 16 until the rear wheels 30 come into contact with a rear inner face or stop of each of the support rails 16. The second pallet is then lowered onto the pallet support rails 16 at a position in front of the cart 20 and the first pallet.

Figure 3:
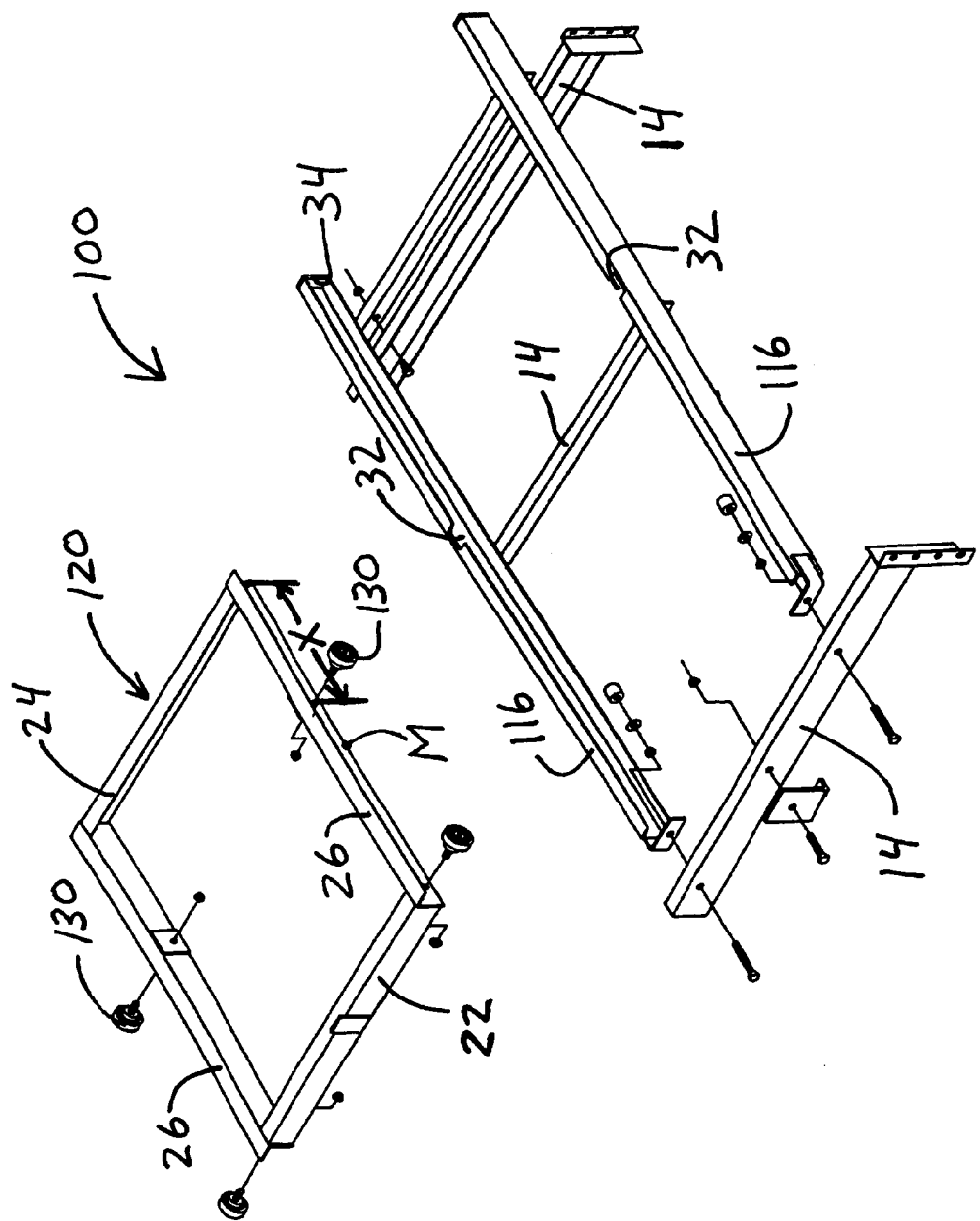
FIG. 3 is a partial perspective view of the components of a pushback rack storage system according to a preferred embodiment of the invention.
Figure 4:
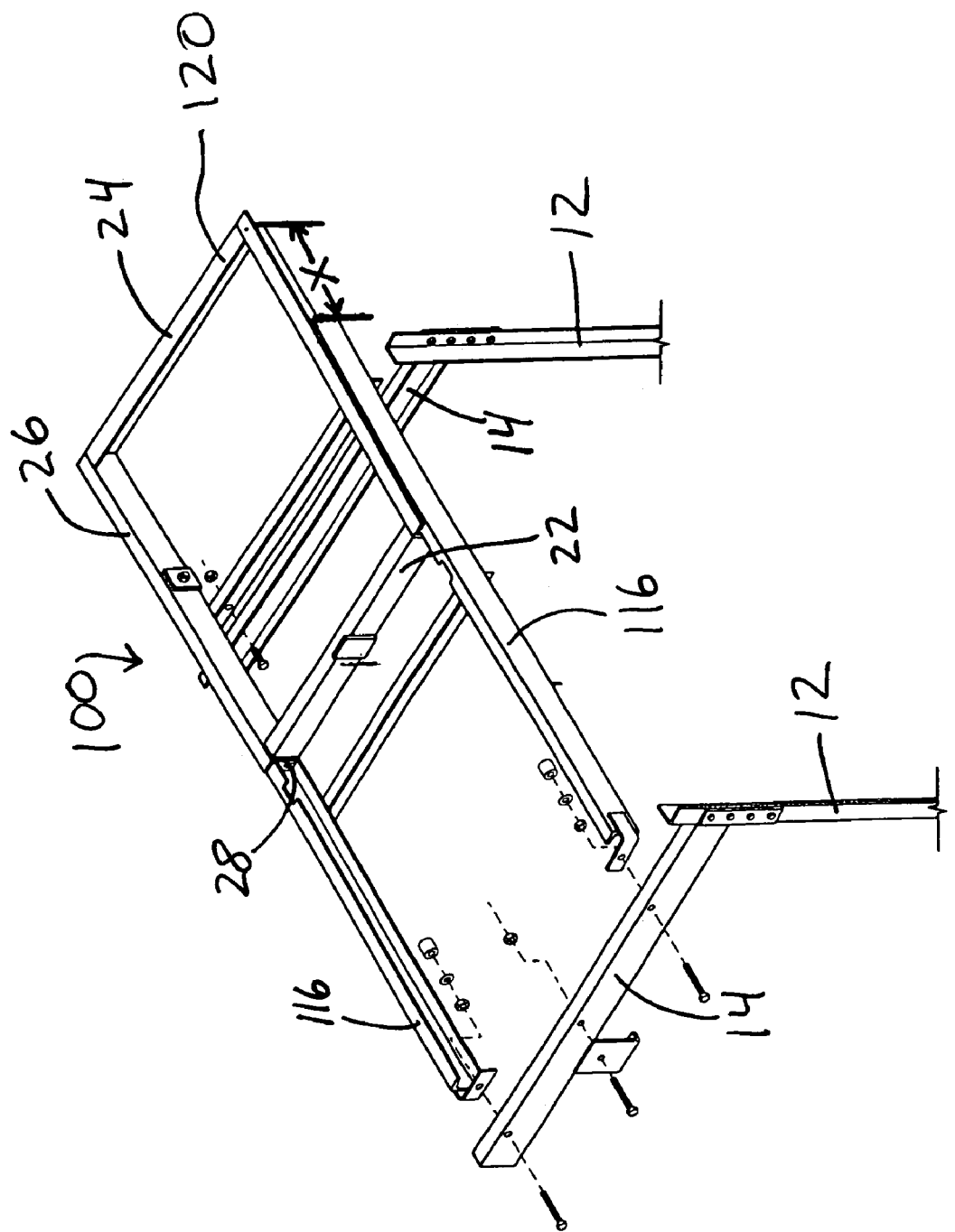
FIG. 4 is a partial perspective view of the pushback rack storage system of FIG. 3 with the cart positioned at the rear end of the support rails.

FIGS. 3 and 4 illustrate an improved pushback cart storage system 100. All of the elements of the improved storage system 100 are preferably similar to those of the prior art storage system 10 described above, with the following changes. The cart 120 includes rear wheels 130 positioned between a midpoint of the cart side rails 26 and the rear end of the cart side rails 26. The distance between the rear wheels 130 and the rear end or rear rail 24 of the cart is indicated by X in FIG. 3. The midpoint is the location M equally spaced apart from the front and rear rails 22, 24 of the cart 120.

In typical applications, dimension X is preferably approximately 30 to 45% of a pallet's length. Thus, each of the rear wheels 130 is preferably located closer to the midpoint of the cart than to the rear end of the cart. In a preferred embodiment, the rear wheels 130 are located at a position at least 55%, 60%, 70%, 80% or 90% of a distance measured from the rear end of the cart to the midpoint of the cart.

The pallet support rails 116 of the storage rack structure 100 are shorter than the pallet support rails 16 of the prior art storage rack structure 10, preferably by approximately the length X. Thus, the pallet support rails 116 are shorter than the prior art support rails 16 by approximately 30 to 45% of a pallet's length. In a preferred 2-deep system, the pallet support rails 116 each have a length that is 155% to 175% of the length of a single pallet. In general, the cart side rails 26 in a 2-deep system each have a length that is 55% to 60% of the length of the pallet support rails 116. In the prior art storage system 10, conversely, the cart side rails 26 have a length that is slightly less than 50% of the length of the support rails 16, since the support rails 16 are much longer than the support rails 116 in the improved storage system 100.

Figure 5:
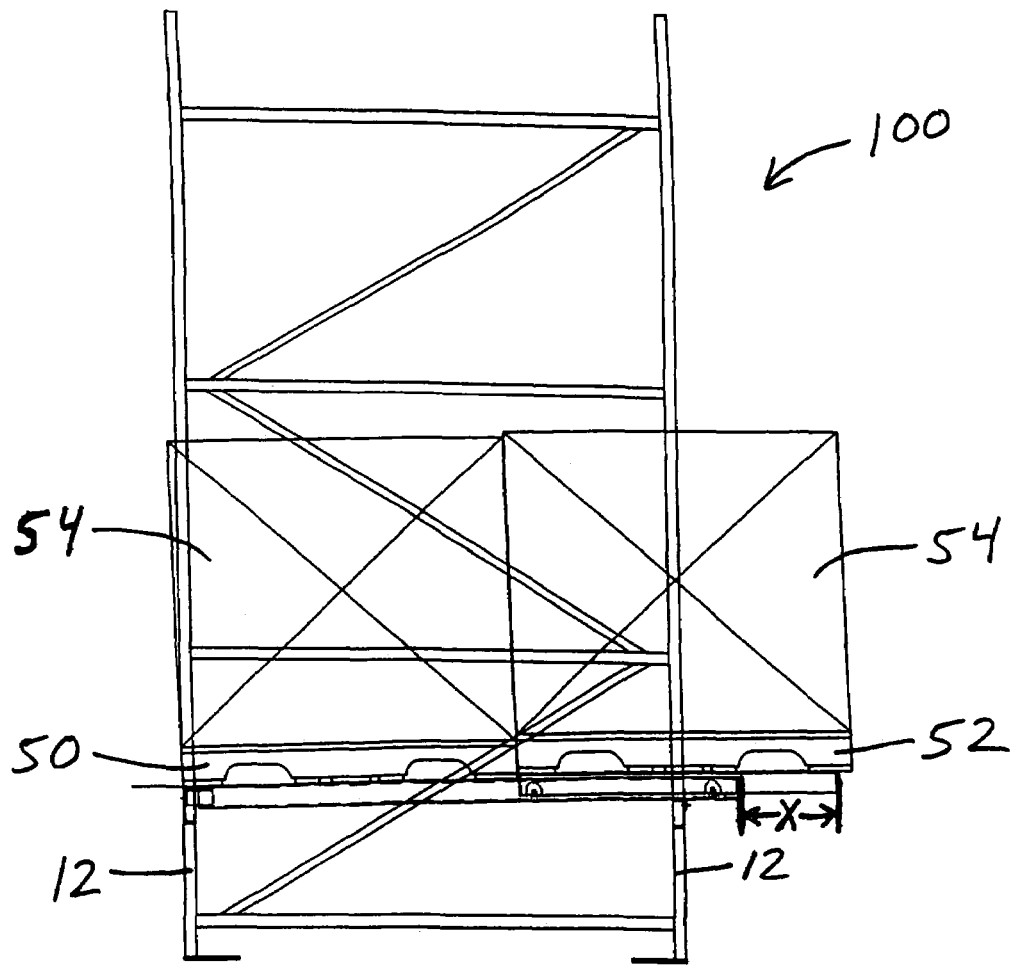
FIG. 5 is a side view of a pushback rack storage system with a cart positioned at the rear end of the support rails.

When the rear wheels 130 on the cart 120 are rolled up against the rear inner faces or stops 34 the pallet support rails 116, the cart 120 extends beyond the rear end of the pallet support rails 116 by approximately the length X (i.e., approximately 30 to 45% of a pallet's length), as shown in FIGS. 4 and 5. In general, the cart side rails 26 and the cart 120 extend beyond the rear end of the pallet support rails 116 by 30% to 45% of the length of the cart side rails 26 (or by 30 to 45% of the length of a pallet to be supported by the cart 120), or by more than 35% of the length of the cart side rails 26.

Because the rear wheels 130 on the cart side rails 26 are located between the midpoint and the rear end of the cart side rails 26, the front wheels 28 of the cart 120 are not forced in an upward direction under normal or substantially uniform loads, even though the cart side rails 26 extend beyond the end of the pallet support rails 116. This is because a substantially uniform load, which is typical in the storage industry, is concentrated at or near the midpoint of the cart 120, which is positioned over the support rails 116.

Additionally, the cart side rails 26, which are preferably made of steel, have considerable cantilever strength, and therefore do not bend or significantly deflect under normal loading conditions. Thus, the improved storage rack 100, with the cart side rails 26 extending beyond the rear ends of the pallet support rails 116, as shown in FIGS. 4 and 5, is able to support two pallets 50, 52 carrying cargo 54, as shown in FIG. 5, just as the prior art storage system 10 is able to support two pallets carrying cargo. The improved storage system 100 is preferably loaded in the same manner as the prior art system 10 described above, and as further described in U.S. Pat. Nos. 5,415,300 and 6,129,223.

The improved storage system 100 has the advantage over the prior art storage system 10, however, of requiring less steel (or other material) to form the pallet support rails 116. By reducing the length (and corresponding material requirements) of each pallet support rail 116 by approximately 15 to 20%, the weight of the rail system 100 is reduced substantially, resulting in significant material fabrication cost savings. Such a cost savings is very significant, particularly in situations where a contractor is chosen to install a storage structure through a competitive bidding process, which is typical in the storage industry. By being able to reduce the overall system cost, a contractor may submit a lower bid than if the contractor were to use the prior art storage system 10, and is therefore more likely to obtain a contract to install a storage system. Thus, the improved storage system 100 provides a significant competitive advantage in the storage industry.

Figure 6:
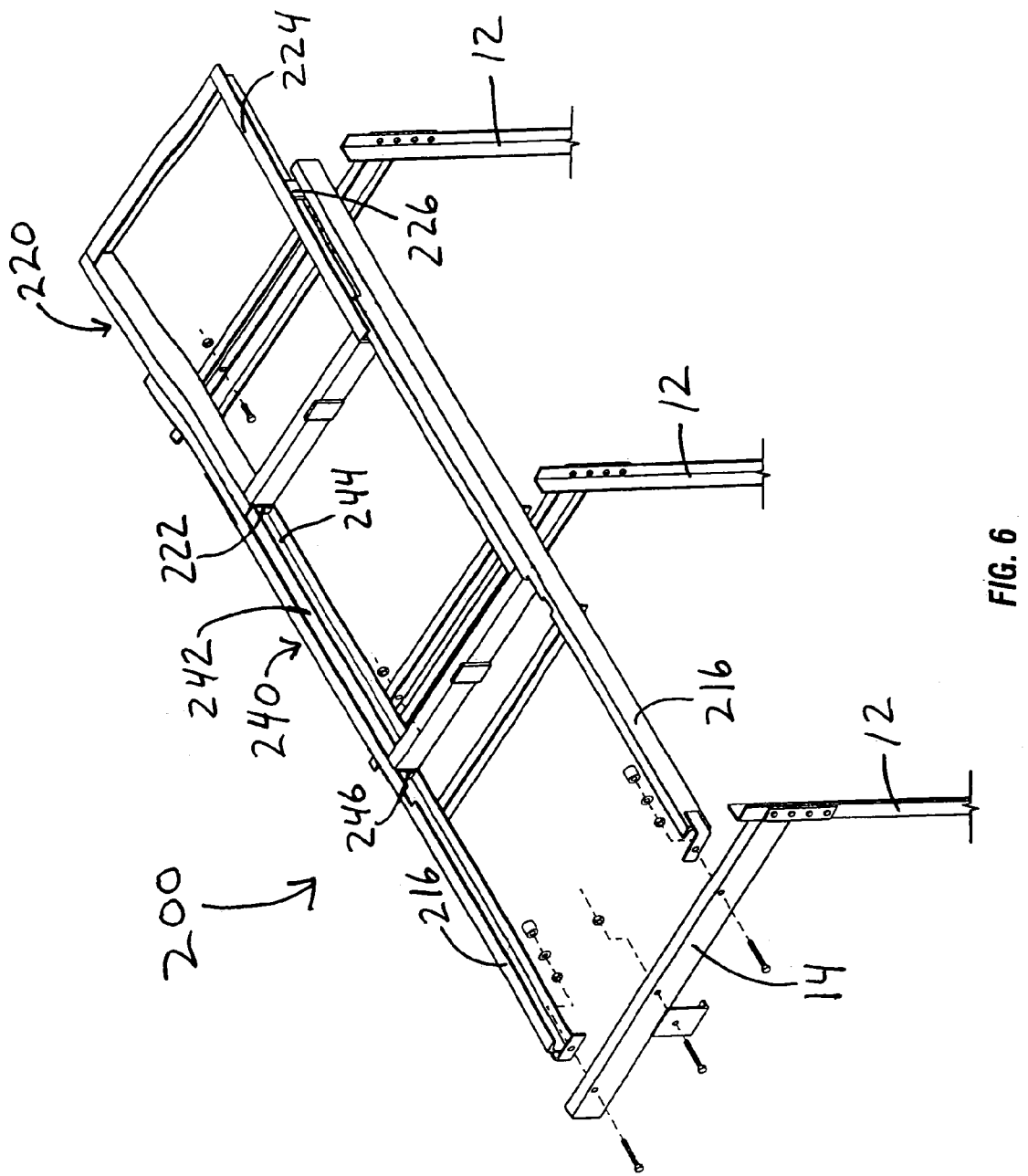
FIG. 6 is a partial perspective view of a pushback rack storage system including two carts, with the rear cart positioned at the rear end of the support rails.

Turning to FIG. 6, a "3-deep" storage rack system 200, including a first or rear cart 220 and a second or front cart 240, is illustrated. The second cart 240 is preferably substantially identical to the prior art cart 20 illustrated in FIGS. 1 and 2. Thus, the cart side rails 242 on the second cart 240 include wheels 246 at the front and rear (not visible) ends of the cart side rails 242. The front and rear wheels 246 roll along inner (or outer) tracks formed in the pallet support rails 216.

The cart side rails 242 on the second cart 240 preferably further include interior (or exterior) tracks or wheel guides 244, along which front wheels 222 on the first cart 220 roll. The first cart 220 further includes rear wheels (not visible) that preferably roll along inner surfaces of the pallet support rails 216. The rear wheels on the first cart 240 are preferably supported on wheel arms 226, so that the second cart 240 can telescope or roll over the first cart 220 (as described in U.S. Pat. Nos. 5,415,300 and 6,129,223), with the rear wheels on the first cart 220 rolling within the pallet support rails 216.

The rear wheels on the first cart 220 are positioned on the cart side rails 224 between the midpoint of the cart side rails 224 and the rear end of the cart side rails 224, as described above with regard to the storage cart 120 of the improved storage rack system 100. Accordingly, the cart side rails 224 on the first cart 220 extend beyond the rear end of the pallet support rails 216 when the rear wheels of the first cart 220 are rolled up against the rear inner faces 34 of the support rails 216, as illustrated in FIG. 6.

Figure 7:
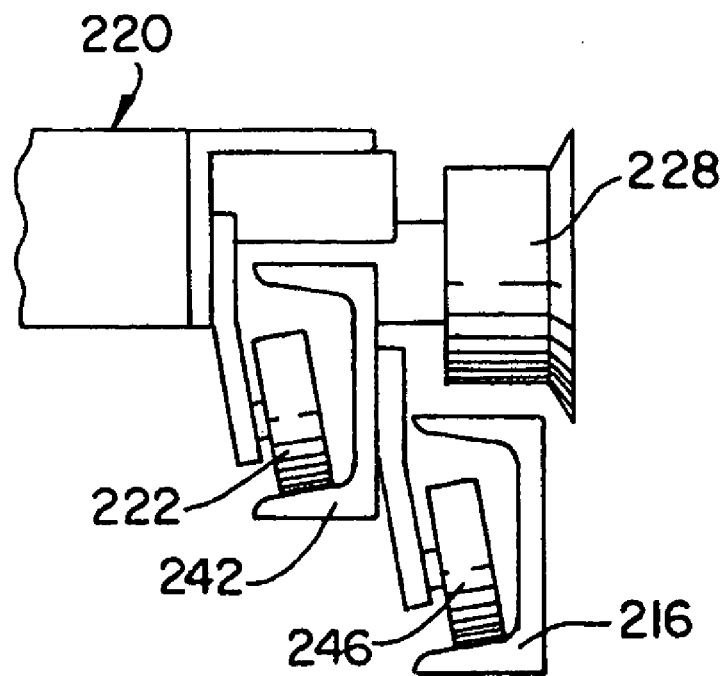
FIG. 7 is a partial front view of an alternative embodiment of the two-cart system illustrated in FIG. 6.
Figure 8:
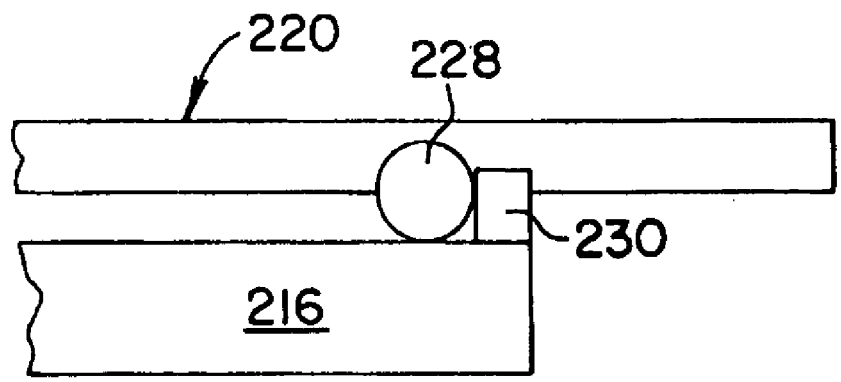
FIG. 8 is a partial side view of the two-cart system illustrated in FIG. 7.

FIGS. 7 and 8 illustrate an alternative embodiment of the 3-deep system illustrated in FIG. 6, wherein the rear wheels 228 on the first cart 220 roll along upper surfaces of the pallet support rails 216, instead of rolling along inner surfaces of the pallet support rails 216. In this embodiment, stops 230, or other suitable stopping means, may be included at the rear end of the support rails 216 to prevent the rear wheels 228 from rolling off of the rear end of the support rails 216.

The 3-deep system may be used to store three pallets in a single storage lane. In use, a first pallet is loaded onto the first cart 220, which is positioned at the front end of the storage rack. The first cart 220 is then pushed back as a second pallet is loaded onto the second cart 240. The second cart 240 is then pushed back as a third pallet is loaded, so that the front wheels 228 on the first cart 220 come into contact with the rear inner faces 34 of the support rails 216, or with stops 230 on top of the support rails 216, as described for the alternative embodiment illustrated in FIGS. 7 and 8, or with some other suitable stopping means. The third pallet may then be loaded onto the now exposed front end of the pallet support rails 216. Examples of similar 3-deep storage systems, and their manner of operation, are described in U.S. Pat. Nos. 5,415,300 and 6,129,223. The primary advantage of the described storage system 200, again, is that less steel (or other material) is required to form the pallet support rails, thus significantly reducing the overall system cost.

Additional carts may be added as desired to increase the number of pallets that may be stored in a single storage lane. In general, every cart except the rear cart would have wheels at front and rear ends of the cart. Both pairs of wheels on the front cart, and the rear wheels on every other cart, would preferably roll along inner or upper surfaces of the pallet support rails, while the front wheels on every cart but the front cart would preferably roll along tracks or wheel guides in the preceding cart, as described in U.S. Pat. Nos. 5,415, 300 and 6,129,223. The rear cart would have wheels at a front end of the cart, and rear wheels located between the midpoint and the rear end of the cart, as described above.

The invention may of course be used with other types of storage rack systems as well, regardless of how the carts are set up to roll on the rack or on each other. Thus, an improved storage rack system has been shown and described various changes, modifications, and substitutions of equivalents may readily be made without departing from the spirit and scope of the invention. The invention, therefore, should not be restricted, except by the following claims.

What is claimed is:

1. A pushback rack storage system, comprising:
a pair of spaced apart support rails each having a front end and a back end;
a first cart including a first pair of spaced apart side rails, each side rail including a first wheel adjacent to a front end of the side rail, and a second wheel located between a back end and a midpoint of the side rail, wherein the midpoint is between, and equally spaced apart from, the front end of the side rail and the back end of the side rail, and wherein each of the second wheels is located closer to the midpoint than to the back end of the side rail to which it is attached;
wherein the second wheels are rollable along the support rails up to the back ends of the support rails, such that the back ends of the side rails extend beyond the back ends of the support rails when the second wheels are adjacent to the back ends of the support rails.

2. The pushback rack storage system of claim 1 further comprising a second cart having a second pair of spaced apart side rails each including a pair of wheels rollable along the support rails.

3. The pushback rack storage system of claim 2 wherein each of the second pair of side rails includes a wheel guide.

4. The pushback rack storage system of claim 3 wherein the first wheels on the first cart are rollable along the wheel guides of the second pair of side rails on the second cart.

5. The pushback rack storage system of claim 1 wherein the first wheels on the first cart are rollable along the support rails up to a front end of the support rails.

6. The pushback rack storage system of claim 1 wherein each of the second wheels is located at a position 80% to 90% of a distance measured from the back end of the side rail to the midpoint of the side rail.

7. The pushback rack storage system of claim 1 wherein the first pair of side rails extend 30% to 45% of their length beyond the back ends of the support rails when the second wheels are rolled up against the back ends of the support rails.

8. A pushback rack storage system, comprising: a pair of spaced apart pallet support rails; a cart including a pair of spaced apart side rails adapted to support a pallet, each side rail including a first wheel located adjacent to a first end of the side rail, and a second wheel located between a second end and a midpoint of the side rail; wherein the second wheels are rollable along the support rails up to a back end of the support rails, such that the side rails extend by about 30% to 45% of their length beyond the back ends of the support rails when the second wheels are rolled up against the back ends of the support rails; wherein each of the second wheels is located closer to the midpoint of the side rail to which it is attached than to the second end of the side rail, wherein the midpoint is between, and equally spaced apart from, the first end of the side rail and the second end of the side rail.

9. The pushback rack storage system of claim 8 further comprising a second cart having:
   a pair of front wheels rollable on the side rails; and
   a pair of rear wheels rollable on the support rails.

10. The pushback rack storage system of claim 8 wherein the first wheels are rollable along the support rails up to a front end of the support rails.

11. The pushback rack storage system of claim 8 wherein each of the second wheels is located at a position 80% to 90% of a distance measured from the second end of the side rail to the midpoint of the side rail.

12. A pushback rack storage system, comprising: a pair of spaced apart support rails; a cart including a pair of spaced apart side rails, each side rail including a first wheel adjacent to a first end of the side rail, and a second wheel between a second end of the side rail and a midpoint of the side rail, wherein the midpoint is between, and equally spaced apart from, the first end of the side rail and the second end of the side rail; with the second wheel at a position that is from 55% to 90% of the distance from the second end of the side rail to the midpoint of the side rail; wherein the second wheels are rollable along the support rails up to a second end of each of the support rails, such that the second ends of the side rails extend beyond the second ends of the support rails when the second wheels are rolled up against the second ends of the support rails.

13. The pushback rack storage system of claim 12 wherein each of the second wheels is located closer to the midpoint of the side rail to which it is attached than to the second end of the side rail, and the second ends of the side rails extend beyond the second ends of the support rails by more than 35% of a total length of the side rails when the second wheels are rolled up against the second ends of the support rails.

14. The pushback rack storage system of claim 1 wherein the side rails of the first cart extend more than about 16 inches beyond the back ends of the support rails, when the second wheels are adjacent to the back ends of the support rails.

\* \* \* \* \*